Feb. 22, 1955  A. E. FLOCK, JR  2,702,678
CARGO LOADER FOR AIRCRAFT
Filed Sept. 23, 1950  3 Sheets-Sheet 1
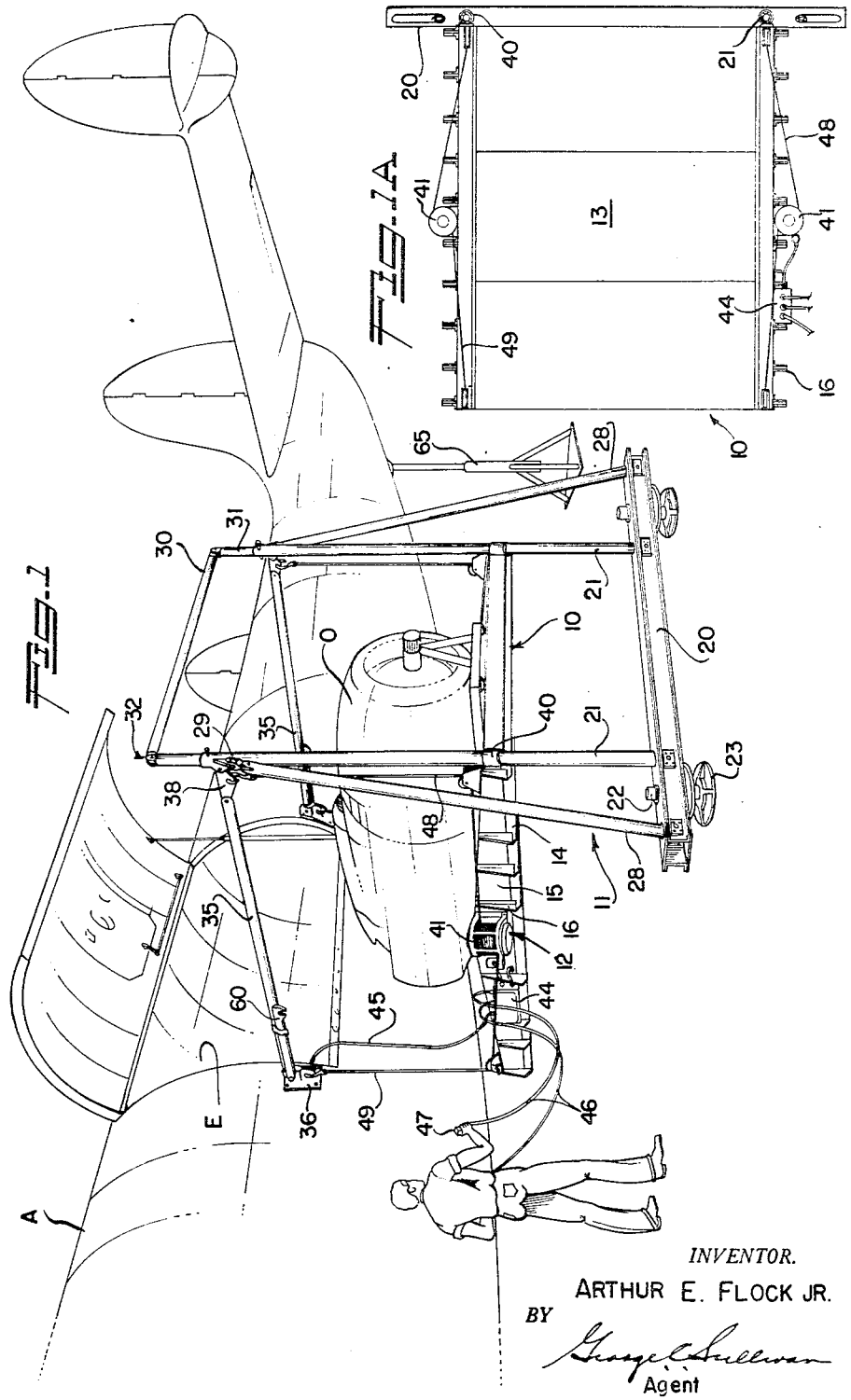
INVENTOR.
ARTHUR E. FLOCK JR.
BY
George C. Sullivan
Agent Feb. 22, 1955　　　A. E. FLOCK, JR　　　2,702,678
CARGO LOADER FOR AIRCRAFT
Filed Sept. 23, 1950　　　　　　　　　3 Sheets-Sheet 2
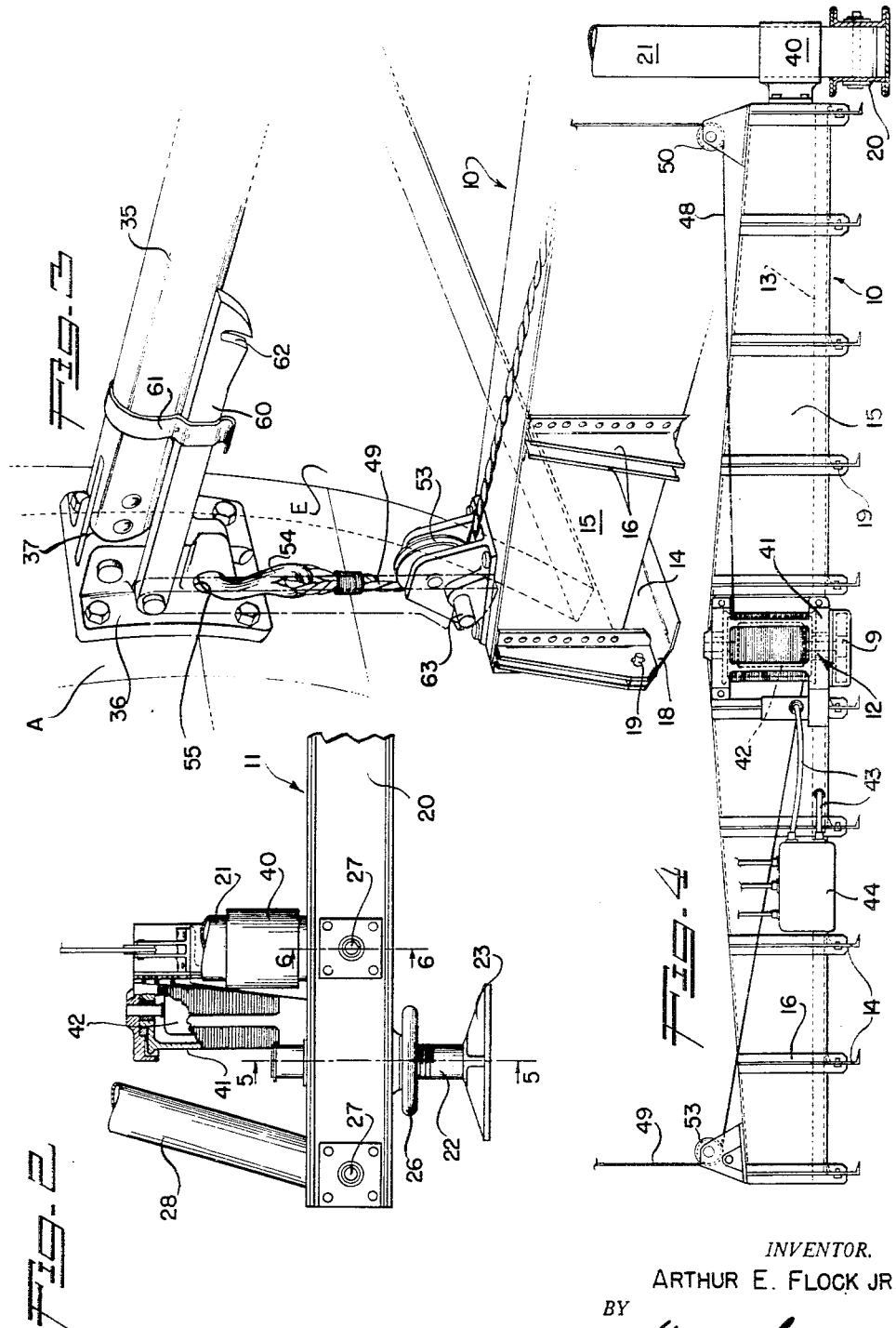
INVENTOR.
ARTHUR E. FLOCK JR.
BY
George C. Sullivan
Agent Feb. 22, 1955 A. E. FLOCK, JR 2,702,678
CARGO LOADER FOR AIRCRAFT
Filed Sept. 23, 1950 3 Sheets-Sheet 3
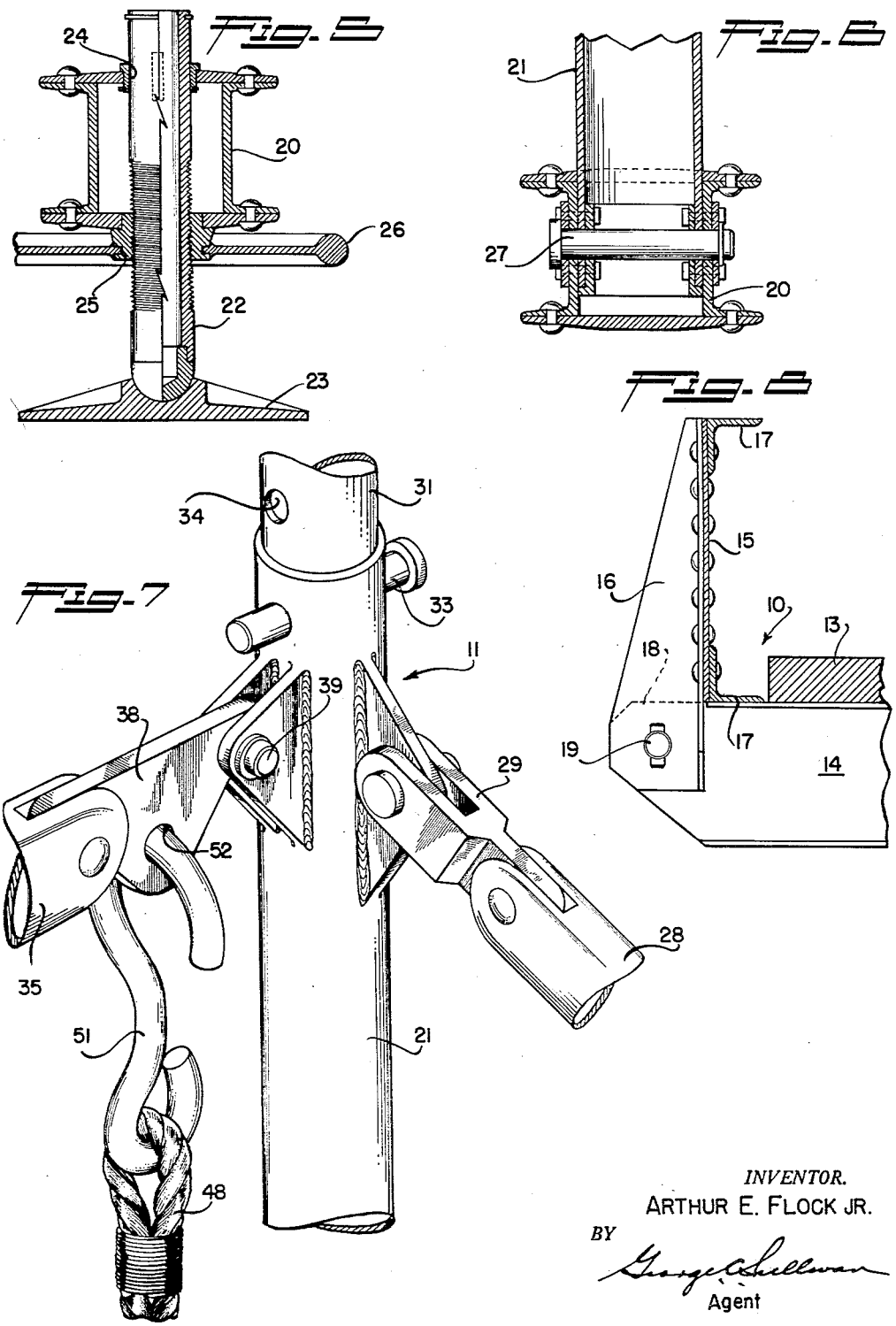
INVENTOR.
ARTHUR E. FLOCK JR.
BY
Agent

United States Patent Office 2,702,678
Patented Feb. 22, 1955

2,702,678

CARGO LOADER FOR AIRCRAFT

Arthur E. Flock, Jr., Sherman Oaks, Calif., assignor to Lockheed Aircraft Corporation, Burbank, Calif.

Application September 23, 1950, Serial No. 186,468

4 Claims. (Cl. 244—137)

This invention relates to cargo handling equipment and relates more particularly to a device for facilitating the loading and unloading of aircraft. It is a general object of the invention to provide a practical, effective device for raising and lowering cargo, etc. to and from the cargo doors or entrances of airplanes, and the like.

Another object of the invention is to provide a lightweight, readily assembled and disassembled device that may be quickly set up or installed at the airplane and that may be transported in the airplane itself when knocked down or disassembled. In accordance with the invention the device embodies a minimum number of simple parts that may be easily assembled at the field by two or three men and can be conveniently stowed away in an airplane, or other vehicle, when disassembled.

Another object of the invention is to provide a device of this character that incorporates a power driven cargo platform movable between the ground or field surface level and the floor of the airplane at the cargo door. This platform, which is a simple part of substantial capacity, is movable vertically at the exterior of the airplane to raise and lower the cargo by a novel electrical winch and cable arrangement which permits tilting of the platform to bring it into proper alignment with the airplane floor.

Another object of the invention is to provide a cargo loader that requires little or no modification of the airplane. The device is entirely external of the airplane and the only minor modification required is the provision of two small fittings adjacent the cargo door to permit the attachment of cables and braces. These fittings are readily applied or installed and add no appreciable weight to the airplane.

A further object of the invention is to provide an aircraft cargo loader that is conveniently controlled and operated. One operator has complete control over the electrical winch means and is operable to regulate or control the same to raise, lower, and tilt the platform at will.

Other objectives and features of the invention will become apparent from the following detailed description of a typical preferred embodiment, throughout which description reference will be made to the accompanying drawings wherein:

Figure 1 is a perspective view illustrating the device of the invention arranged at a typical airplane showing the platform in a partially raised position;

Figure 1A is a reduced plan view of the platform;

Figure 2 is an enlarged fragmentary front view of one end portion of the frame illustrating one of the jacks and adjacent parts;

Figure 3 is an enlarged fragmentary perspective view illustrating a portion of the platform and one of the fittings on the airplane carrying one of the frame braces and anchoring one of the cables;

Figure 4 is an enlarged side elevation showing the platform, the winch means and a portion of the frame;

Figure 5 is an enlarged fragmentary vertical sectional view taken as indicated by line 5—5 on Figure 2, illustrating one of the jacks;

Figure 6 is an enlarged fragmentary vertical sectional view taken as indicated by line 6—6 on Figure 2, showing the means for securing one of the stanchions;

Figure 7 is an enlarged fragmentary perspective view of a portion of one of the stanchions, showing a cable attachment and adjacent parts; and Figure 8 is an enlarged fragmentary vertical sectional view of an end or side portion of the platform.

The aircraft cargo loader of the invention may be said to comprise, generally, a platform 10, a frame 11 arranged at the exterior of the airplane A, and a power operated cable system 12 associated with or connected between the frame 11 and the airplane A for raising and lowering the platform 10.

The platform 10 is preferably a rectangular unit or structure and in accordance with the broader aspects of the invention may be of any selected construction. In the case illustrated, the platform 10 includes a decking 13 of metal or wood supported by spaced horizontal beams 14. Beams 15 extend along the two opposite sides of the platform 10 and are provided at their outer surfaces with spaced pairs of vertically arranged braces 16. The beams 15 may be further reinforced by inturned angle members 17 extending along their upper and lower edges, as illustrated in Figure 8. It is contemplated that the assemblies of the beams 15 with their reinforcing elements 16 and 17 be detachable from the platform beams 14 to permit a more compact stowing of the device when disassembled. To this end, the horizontal platform beams 14 have tongues 18 extending from their opposite ends and received between lower portions of the beam braces 16 where they are detachably secured by pins 19, or the like.

The frame 11 serves to guide and partially support the vertically movable platform 10 and includes a horizontal base beam 20 and two spaced posts or stanchions 21 rising therefrom. With the device in the operative position the base beam 20 is substantially at the ground level and extends parallel with the fuselage of the airplane A. Suitable leveling jacks are preferably provided for the beam 20 to level the beam and adjust the stanchions 21 to bring the latter to the proper substantially vertical positions. As best illustrated in Figures 2 and 5, these jacks include vertical threaded stems 22 provided at their lower ends with ground engaging pads 23 and slidably passing inwardly through openings 24 in the beam 20 where they are keyed or otherwise held against rotation. Nuts 25, reacting or engaging against the lower side of the beam 20, have threaded engagement on the studs 22 and are provided with handles or wheels 26 to facilitate their manual operation. The posts or stanchions 21 are spaced from the opposite ends of the base beam 20, the spacing of the stanchions being determined largely by the width of the cargo entrance E of the airplane A. The stanchions 21 are tubular members and their lower ends extend into the base beam 20. It is preferred to provide releasable or detachable connections between the stanchions 21 and the beam 20 so that the frame may be disassembled for stowage and transportation in a compact form. As best illustrated in Figure 6, removable bolts or pins 27 pass through transverse openings in the beam 20 and the lower portions of the stanchions 21 which are preferably reinforced at the connections. The frame 11 further includes canted side supports 28 which have their upper ends detachably secured to the stanchions by suitable clevis connections 29, or the like. The lower ends of the side supports 28 are secured to the base beam 20 by removable bolts or pins 27 in the same manner as the stanchions 21.

The frame 11 is provided with a horizontal spacer tube 30 for holding the upper ends of the stanchions 21 in the proper spaced relation. The tube 30 extends between tubular extensions 31 which telescope into the upper ends of the stanchions 21. The releasable clevis means 32 secure the spacer tube 30 to the upper ends of the extensions 31. The extensions 31 may be secured or held in selected elevated positions by pins 33 passed through transverse openings 34 in the stanchions and the extensions. In this manner the extensions 31 may be arranged to elevate the spaced tube 30 to positions where it does not interfere with the loading or unloading of large objects. The frame 11 also includes horizontal braces 35 extending from the stanchions 21 to fittings 36 on the airplane A. The braces 35, which are preferably tubular, are detachably secured to the fittings 36 by clevis and pin connections 37. The outboard ends of the braces 35 are provided with hanger plates 38, whose function will later become apparent, and these plates are, in turn, detachably secured to the stanchions 21 by pin connections 39. This is best illustrated in Figure 7. It will be observed that the frame 11 is a simple, light-weight structure that may be quickly assembled at the airplane A and that may be easily disassembled for compact stowage or packaging.

As mentioned above, the vertically movable platform 10 is guided by the frame 11. The stanchions 21 of the frame 11 constitute vertical guide posts for the platform 10. The outboard end of the platform 10 carries tubular collars or sleeves 40 which engage around and slidably travel on the stanchions 21 to direct or guide the platform during its vertical movement.

The power driven cable system 12 includes an electric winch 41 mounted on each side beam 15 of the platform 10. The winches 41 are arranged on the outer sides of the beams 15 and are positioned vertically, that is, their axes of rotation are substantially vertical. The winches 41 may be of any appropriate type, for example each may be driven by a reversible electric motor 42 and the drum or winch 41 may surround the motor to be driven thereby through a speed reducing gear box 9, this type of mechanism being readily commercially available. It is preferred to arrange the winches 41 substantially midway between the ends of their respective platform beams 15 so that the stretch of the cables extending therefrom is substantially equal. The energizing leads 43 for the winch motors 42 extend to a box 44 on one of the beams 15 which contains the reversing switches for the motors and the relays for the same, such apparatus being conventional with reversible electric motors of this kind. The motors 42 may be energized by the batteries, generators, or other electrical sources in the airplane A or by field service lines. I have shown a power line 45 extending from the switch box 44 into the airplane A. In accordance with the invention the motors 42 for the winches 41 are individually controllable by the operator. For this purpose I have shown flexible insulated control leads 46 extending from the switch box 44 and provided at their ends with "forward and reverse" manual switches 47 adapted to be controlled by the operator standing on the ground, as illustrated in Figure 1, or positioned within the airplane A.

Each of the above described winches 41 operates two platform actuating cables 48 and 49. The cables 48 extend in the outboard direction from their respective winches 41 and pass around direction changing guide pulleys 50 on the outboard corners of the platform 10 and thence upwardly to the above-described plates 38. As best shown in Figure 7, appropriate hooks 51 on the upper ends of the cables 48 removably engage through openings 52 in the plates 38 to anchor the cables to the frame 11. The cables 49 extend in the inboard direction from their respective winches 41 to direction changing pulleys 53 mounted on the inboard corners of the platform 10 and continue upwardly to the fittings 36 on the airplane A. Suitable hooks 54 on the cables 49 are detachably engaged in openings 55 in the fittings 36 to anchor the upper ends of the cables to the airplane A. The cables 48 and 49 are trained or reeled on their respective winches 41 to extend from opposite sides thereof, one cable being wrapped on in the right hand direction and the other cable being wrapped on in the left hand direction. Accordingly, when a drum or winch 41 is rotated in one direction, both cables 48 and 49 are played out, and when the drum is rotated in the other direction both cables 48 and 49 are reeled onto the drum. Where the cables 48 and 49 have their upper ends anchored as just described, unreeling or playing out of the cables results in lowering of the platform 10 and the rotation of the winches 41 to reel up or reel in the cables results in raising of the platform. Thus, energizing of the motors 42 and operation of the winches 41 causes raising or lowering of the platform 10 at the will of the operator controlling the switches 47.

Means is provided for holding or latching the platform 10 at the cargo entrance E of the airplane A and to prevent unavoidable stretching of the cables 48 and 49 from allowing the platform to sag or "jump" under the influence of a heavy load moved onto or off of the platform. This means includes latches 60 hinged to the fittings 36 and normally releasably held in raised positions at the braces 35 by spring clips 61. The latches 60 may be swung downwardly to have their hooks or notches 62 receive pins 63 on the platform assembly. It will be seen how the latches 60 cooperating with the pins 63 are operable to prevent unwanted vertical movement of the platform 10 when located at the cargo entrance E of the airplane A.

It is believed that the operation and features of the device will be apparent from the foregoing detailed description. The platform 10 may be packed and transported as a unit or its side beam assemblies 15—16—17 may be handled separately and then secured to the platform beams 14 when the device is to be assembled for use. The frame 11 is made up of readily assembled tubular elements, the base beam 20, etc. and is accordingly readily shipped by airplane or other vehicle and adapted to be quickly erected at the field. The jacks are adjustable by their hand wheels 26 to bring the beam 20 to a substantially horizontal position on the ground or field and to bring the stanchions 21 to vertical positions. Where the objects to be handled are large or high, the spacer tube 30 may be set at an elevated position, as described above, where it does not interfere with the handling of the objects at the platform 10. Assuming that the device is assembled at the airplane A, the platform 10 may be lowered to the ground level by operation of the winches 41 to play out the cables 48 and 49. This permits the object O to be easily moved onto the platform. Where the object O is initially delivered on a truck, or the like, the platform 10 may, of course, be moved to a position where it is substantially flush with the bed of the truck, to receive the object therefrom. Operation of the winches 41 may then raise the platform 10 to the sill of the cargo entrance E of the airplane to permit the object to be moved into the airplane. At this time, the latches 60 may be engaged on the pins 63 to prevent unwanted or undesirable movement of the platform 10. In some instances the sill of the cargo entrance E may not be horizontal or the platform 10 may not ride truly horizontal. In such cases the operator, by selective actuation of the hand switches 47, may individually energize the motors 42 to tilt the platform 10 in the fore and aft direction to bring it into position where it is properly aligned with the sill of the entrance E. The working clearance between the sleeves 40 and the stanchions 21 and deflection of the platform 10 itself allow for this tilting of the platform by the forces exerted by the motors 42, it being understood that it is seldom if ever necessary to move the platform vertically any appreciable distance when in the tilted condition. Where the device is to be used with certain types or classes of aircraft and/or where the cargo to be handled is quite heavy, it may be desirable or necessary to arrange a tail stand 65 under the aft portion of the aircraft fuselage to resist the action of variable vertical loads that may be imposed during the unloading or loading operation and to restrain sidewise movement of the fuselage due to wind loads, or the like. The tail stand 65 should have some vertical adjustment but may be of any selected or appropriate type.

Having described only a typical form of the invention I do not wish to be limited to the specific details herein set forth, but wish to reserve to myself any variations or modifications that may appear to those skilled in the art and fall within the scope of the following claims.

I claim:

1. In combination; an airplane; and a device for loading and unloading the airplane comprising a ground supported frame having stanchions spaced from the airplane, anchor fittings on the airplane, a platform guided for vertical movement by the stanchions, winches arranged on opposite margins of the platform, two cables wound on each of the winches, one cable of each winch being anchored at a fitting and the other cables being anchored to the frame, the cables being arranged so that rotation of the winches moves the platform vertically, and means for selectively operating the winches so that the platform may be tilted.

2. In combination; an airplane having a cargo entrance, a frame external of the airplane including a base beam, posts rising from the beam and braces for the posts, fittings on the airplane at said entrance anchoring at least certain of the braces, a platform guided by said posts for vertical movement toward and away from said entrance, spaced winches on the platform, two cables wound on each winch and extending in opposite directions therefrom, one cable of each winch being anchored to a post and the other cable of each winch being anchored to a fitting, a separate means for rotating each winch to raise and lower the platform and to tilt the platform into conformance with said entrance, and releasable means on said fittings for securing the platform at the entrance.

3. In combination; an airplane having a cargo entrance, a frame external of the airplane including a base beam, leveling ground engaging jacks for the beam, and posts rising from the beam and braces for the posts, fittings on the airplane at said entrance anchoring at least certain of the braces, a platform guided by said posts for vertical movement toward and away from said entrance, spaced winches on the platform, two cables wound on each winch and extending in opposite directions therefrom, one cable of each winch being anchored to a post and the other cable of each winch being anchored to a fitting, and separate means for individually rotating the winches to raise and lower the platform and to tilt it into conformance with the entrance.

4. In combination; an airplane having a side entrance, and a loading device including a platform having decking and two end beams, beams being spaced fore and aft of the airplane, a frame including a base beam, posts rising from the base beam and braces extending from the posts toward the airplane, fittings secured on the airplane adjacent said entrance and anchoring said braces, parts on the platform cooperating with the posts to guide the platform for vertical movement, and means for moving the platform vertically including a winch on each of said end beams of the platform, cables extending in opposite directions from each winch, one cable from each winch being anchored to a post and the other cable of each winch being anchored to a fitting, and independently controllable reversible electric motor means associated with each winch for rotating the winches individusually whereby the platform may be raised and lowered and tilted fore and aft of the airplane when in a raised position to mate with said entrance.

References Cited in the file of this patent

UNITED STATES PATENTS

| 727,407 | Murphy | May 5, 1903 |
| 1,034,941 | Wallace | Aug. 6, 1912 |
| 1,613,901 | Parrish | Jan. 11, 1927 |
| 1,615,813 | Romine | Jan. 25, 1927 |
| 2,242,891 | Light | May 20, 1941 |
| 2,483,109 | Smith | Sept. 27, 1949 |

FOREIGN PATENTS

| 501,302 | Great Britain | Feb. 24, 1939 |

OTHER REFERENCES

Publication, Aviation Week, March 1, 1948, pp. 20, 21. (Copy available in Div. 22, class 244/137.5.)